United States Patent
Lu

(10) Patent No.: US 9,442,582 B2
(45) Date of Patent: Sep. 13, 2016

(54) PORTABLE ELECTRONIC DEVICE WITH A SURFACE MOUNTED TECHNOLOGY TOUCH PAD

(71) Applicant: Tatung Technology Inc., Taipei (TW)

(72) Inventor: Ming-Yih Lu, Taipei (TW)

(73) Assignee: TATUNG TECHNOLOGY INC. (TW)

( * ) Notice: Subject to any disclaimer, the term of this patent is extended or adjusted under 35 U.S.C. 154(b) by 29 days.

(21) Appl. No.: 14/521,535

(22) Filed: Oct. 23, 2014

(65) Prior Publication Data

US 2016/0117001 A1   Apr. 28, 2016

(51) Int. Cl.
*G06F 3/041* (2006.01)
*G06F 3/0354* (2013.01)

(52) U.S. Cl.
CPC ................. *G06F 3/03547* (2013.01)

(58) Field of Classification Search
USPC ......................................................... 345/173
See application file for complete search history.

(56) References Cited

U.S. PATENT DOCUMENTS

| 2006/0250377 A1* | 11/2006 | Zadesky | G06F 1/1613 345/173 |
| 2009/0179854 A1* | 7/2009 | Weber | G06F 1/1626 345/156 |
| 2009/0179862 A1* | 7/2009 | Strong, IV | G06F 1/1616 345/169 |
| 2014/0340353 A1* | 11/2014 | Chen | G06F 3/046 345/174 |

* cited by examiner

*Primary Examiner* — Long D Pham
(74) *Attorney, Agent, or Firm* — Bacon & Thomas, PLLC

(57) ABSTRACT

A portable electronic device with an SMT touch pad comprises a main printed circuit board and an SMT touch pad. The main printed circuit board has a top surface arranged thereon an SMT area, and a bottom surface, wherein the SMT area has a plurality of conductive pads arranged in a first pattern. The SMT touch pad has a touch surface and a mounting surface formed thereon a plurality of conductive pads with solder arranged in a second pattern that is a mirror of the first pattern on the main printed circuit board. The mounting surface of the SMT touch pad is placed onto the top surface of the main printed circuit board and the SMT touch pad is soldered onto the SMT area of the main printed circuit board.

9 Claims, 5 Drawing Sheets

PORTABLE ELECTRONIC DEVICE WITH A SURFACE MOUNTED TECHNOLOGY TOUCH PAD

BACKGROUND OF THE INVENTION

1. Field of the Invention

The present invention relates to a portable electronic device and, more particularly, to a portable electronic device with an SMT (Surface Mount Technology) touch pad.

2. Description of Related Art

Modern consumer electronic apparatuses are typically equipped with touch panels for use as their input devices. The principle of touch panels is based on different sensing manners to detect a voltage, current, acoustic wave, or infrared to thereby detect the coordinates of touch points on a touch pad where a finger or other medium touches.

FIG. 1A is an exploded view of a prior portable electronic device with a touch pad. As shown in FIG. 1A, the portable electronic device is, for example, a remote control, which includes a main printed circuit board 110 and a touch pad 120. The main printed circuit board 110 has a top surface arranged thereon a touch pad area 111 and an opening 113. The touch pad 120 has a connector 123 for connecting to the main printed circuit board 110 through a flexible cable 121. As shown, one end of the flexible cable 121 is connected to the connector 123 of the touch pad 120, and the other end of the flexible cable 121 is a pin header 125 for connecting to the main printed circuit board 110.

FIG. 1B is a schematic diagram for illustrating the assembly of the main printed circuit board 110 and the touch pad 120. As shown in FIG. 1B, the touch pad 120 is glued on the touch pad area 111 of the main printed circuit board 110, and the flexible cable 121 is passed through the opening 112 for electrical connection to main printed circuit board 110.

FIG. 1C is another schematic diagram for illustrating the assembly of the main printed circuit board 110 and the touch pad 120. It is a view that shows the other side of the main printed circuit board 110. As shown, the pin header 125 is plugged into a connector 115 of the main printed circuit board 110. Such that the touch pad 120 is electrically connected to the main printed circuit board 110 through the flexible cable 121.

In such a prior remote control, for connecting the touch pad 120 to the main printed circuit board 110, the flexible cable 121 has to be bent for passing through the opening 113, which increases the working time and cost. In addition, the bent angle has to match a specific angle so as to plug the pin header 125 into the connector 115, resulting in not only increasing the working time but also prolonging the workpiece processing time. Therefore, it is desirable to provide an improved portable electronic device to mitigate and/or obviate the aforementioned problems.

SUMMARY OF THE INVENTION

The object of the present invention is to provide a portable electronic device with an SMT touch pad, which can decrease the work-piece processing time and also reduce the working time and cost.

To achieve the object, there is provided a portable electronic device with an SMT touch pad, which comprises a main printed circuit board and an SMT touch pad. The main printed circuit board has a top surface arranged thereon an SMT area, and a bottom surface, wherein the SMT area has a plurality of conductive pads arranged in a first pattern. The SMT touch pad has a touch surface and a mounting surface formed thereon a plurality of conductive pads with solder arranged in a second pattern that is a mirror of the first pattern on the main printed circuit board. The mounting surface of the SMT touch pad is placed onto the top surface of the main printed circuit board and the SMT touch pad is soldered onto the SMT area of the main printed circuit board.

Other objects, advantages, and novel features of the invention will become more apparent from the following detailed description when taken in conjunction with the accompanying drawings.

DETAILED DESCRIPTION OF THE PREFERRED EMBODIMENT

Figure 1A:
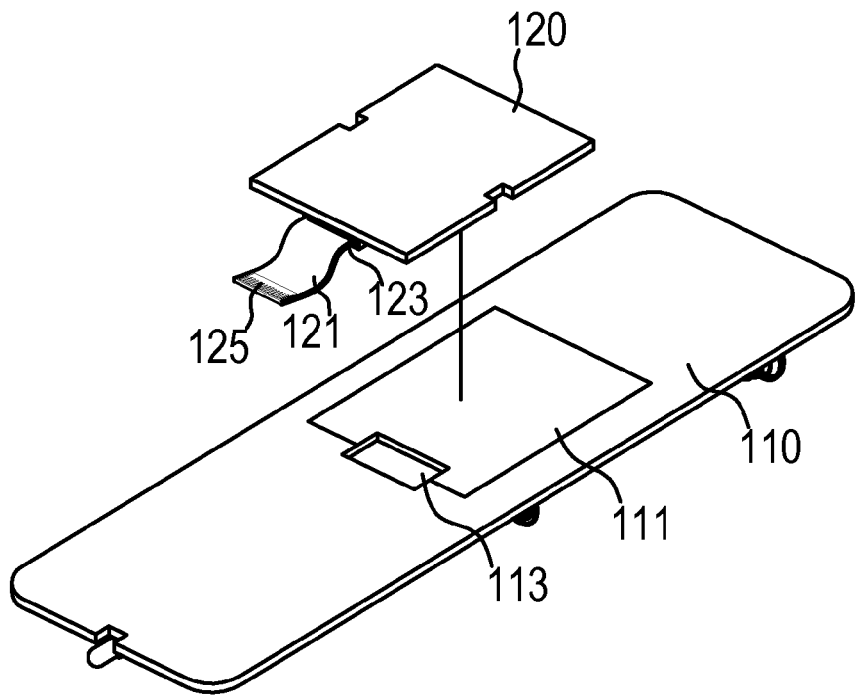
FIG. 1A is an exploded view of a prior portable electronic device with a touch pad.
Figure 1B:
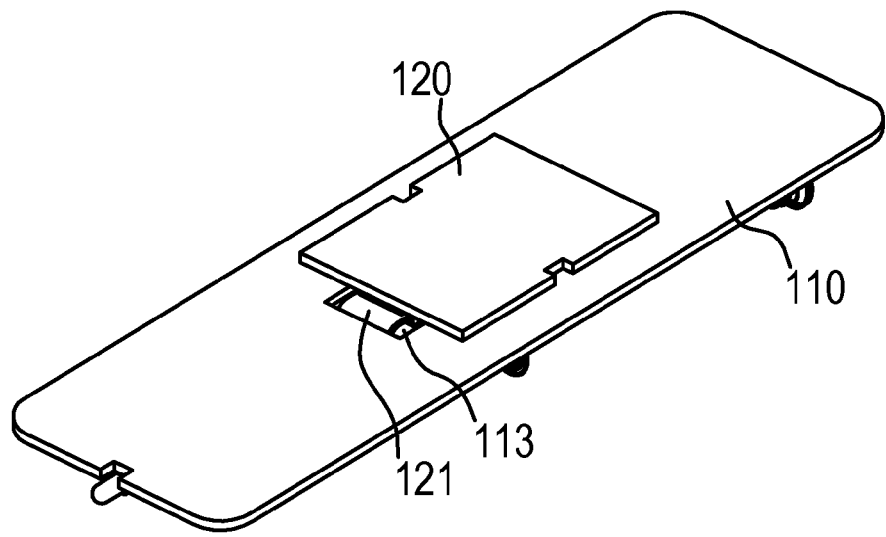
FIG. 1B is a schematic diagram for illustrating the assembly of main printed circuit board and touch pad of a prior remote control.
Figure 1C:
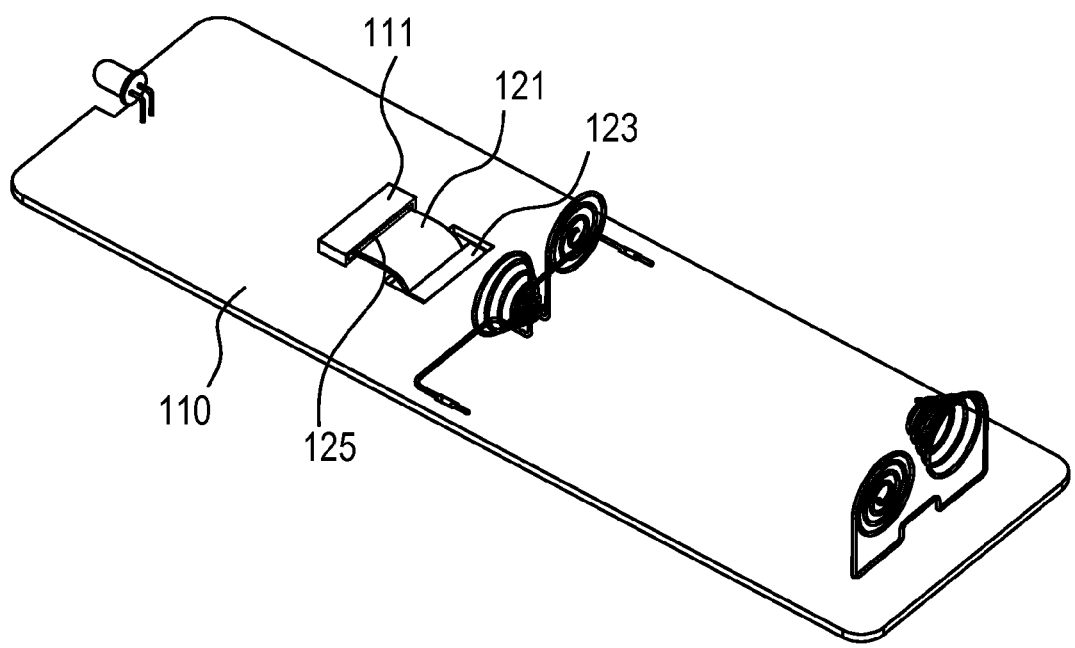
FIG. 1C is another schematic diagram for illustrating the assembly of main printed circuit board and touch pad of a prior remote control.
Figure 2:
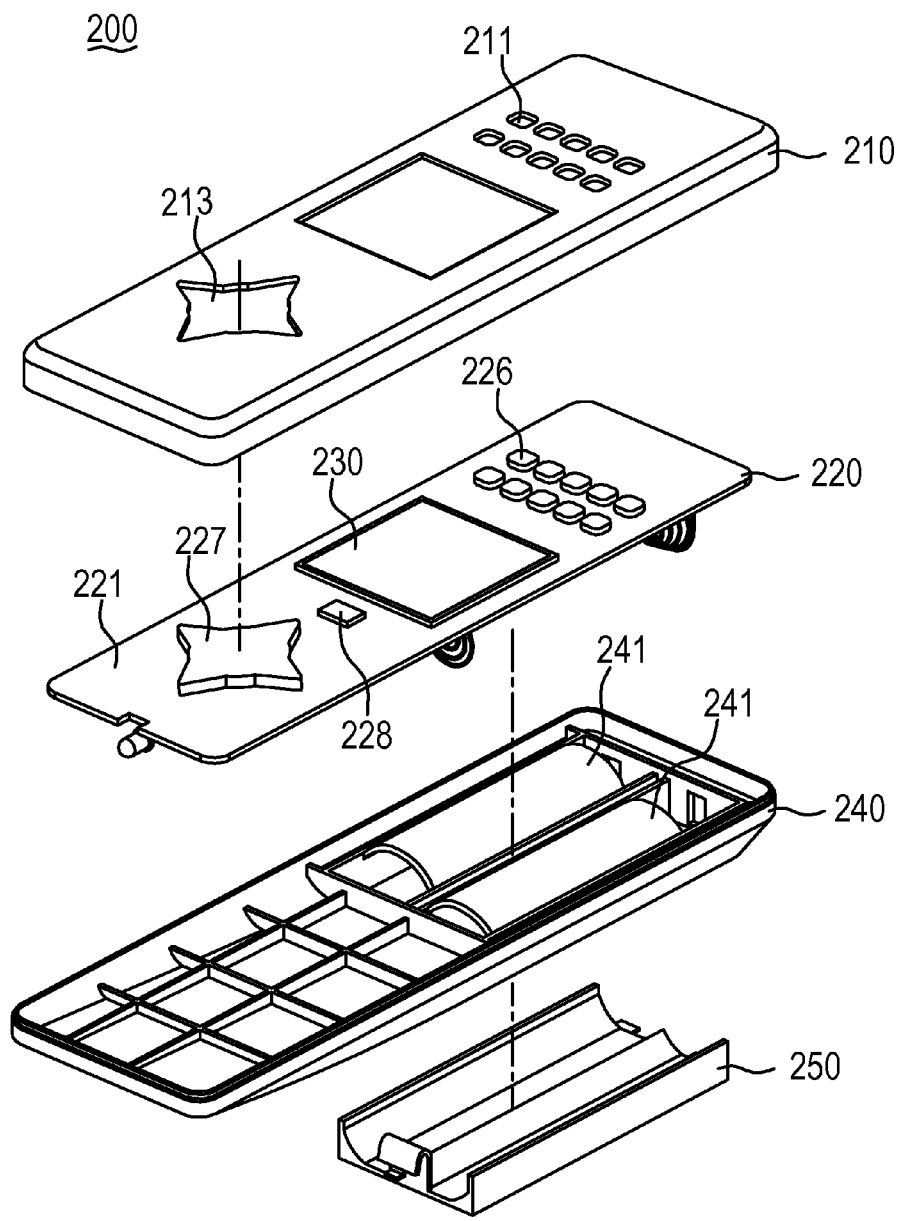
FIG. 2 is an exploded view of a portable electronic device with an SMT touch pad in accordance with an embodiment of the invention.
Figure 3:
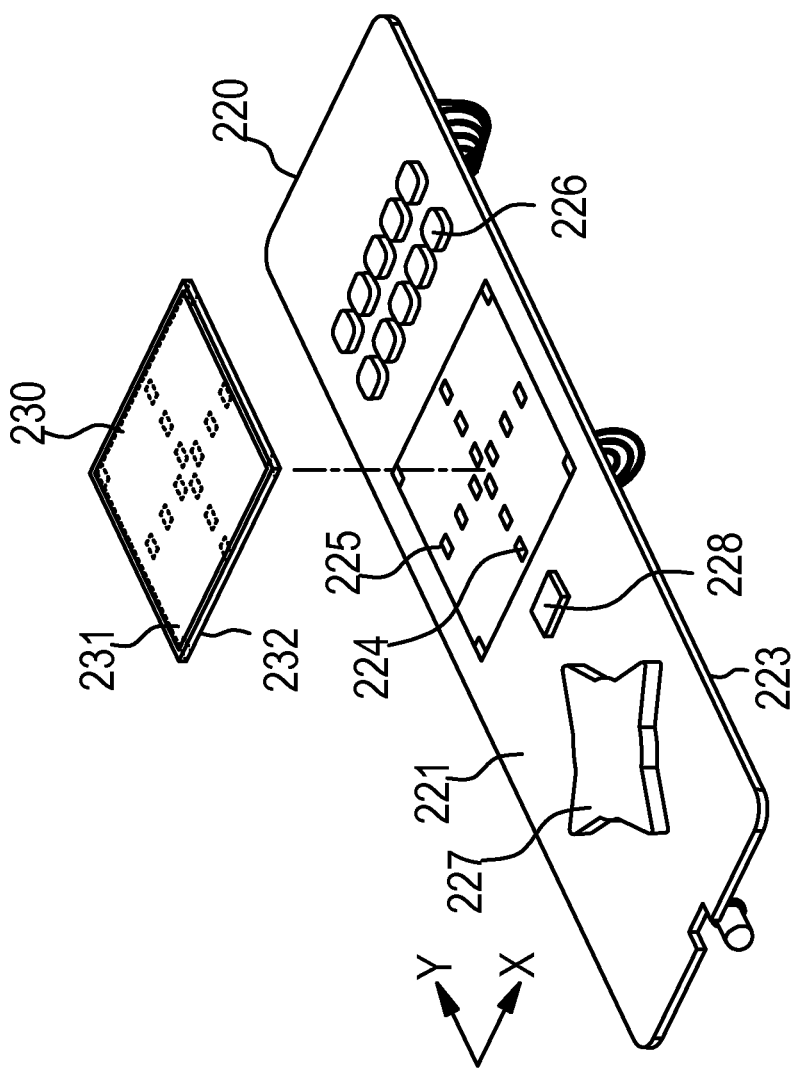
FIG. 3 is a schematic view illustrating a main printed circuit board and an SMT touch pad in accordance with an embodiment of the invention.

FIG. 2 is an exploded view of the portable electronic device with an SMT touch pad 200 in accordance with an embodiment of the invention. FIG. 3 is a schematic view illustrating a main printed circuit board and an SMT touch pad of the portable electronic device with an SMT touch pad 200 in accordance with an embodiment of the invention. As shown in FIG. 2 and FIG. 3, the portable electronic device with an SMT touch pad 200 in this embodiment is a remote control, which includes a front cover 210, a main printed circuit board 220, an SMT touch pad 230, a back cover 240, and a battery housing 250.

The front cover 210 includes a plurality of key openings 211 corresponding to a plurality of selecting buttons 226 arranged on the main printed circuit board 220, and a directional opening 213 corresponding to the directional selecting element 227 arranged on the main printed circuit board 220.

The main printed circuit board 220 has a top surface 221 arranged thereon an SMT area 222, and a bottom surface 223, wherein the SMT area 222 has a plurality of conductive pads 224, 225 arranged in a first pattern. The plurality of conductive pads 224 are arranged in a first direction (Y), and the plurality of conductive pads 225 are arranged in a second direction (X), and the first direction (Y) is perpendicular to the second direction (X) so as to form the first pattern, wherein the first pattern is a cross-like pattern.

The main printed circuit board 220 includes the plurality of selecting buttons 226, the directional selecting element 227, and a control circuit 228.

The plurality of selecting buttons 226 are distributed on the top surface 221 of the main printed circuit board 220, wherein each of the plurality of selecting buttons 226 is a thin film switch.

The directional selecting element 227 is installed on the top surface 221 of the main printed circuit board 220, and the directional selecting element 227 has four directional edges for being pressed conveniently.

The control circuit 228 is connected to the SMT touch pad 230 through soldering the SMT touch pad 230 onto the SMT area 222 of the main printed circuit board 230, so as to control the operation of the SMT touch pad 230.

Figure 4:
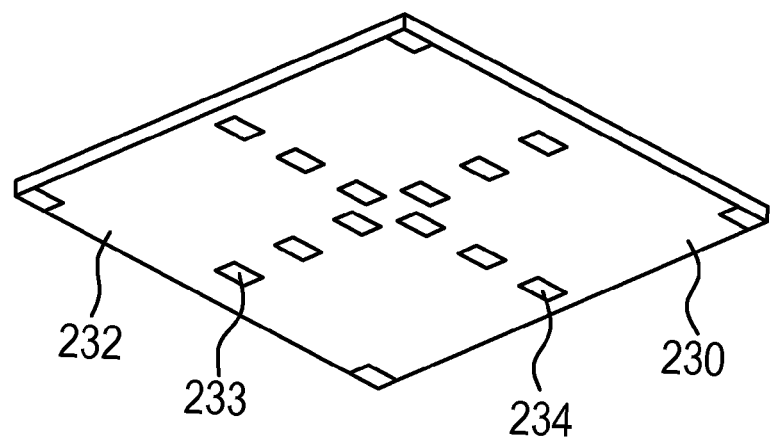
FIG. 4 schematically illustrates the bottom side of the SMT touch pad in accordance with an embodiment of the invention.

FIG. 4 schematically illustrates the bottom side of the SMT touch pad in accordance with an embodiment of the invention. As shown in FIG. 3 and FIG. 4, the SMT touch pad 230 has a touch surface 231 and a mounting surface 232 formed thereon a plurality of conductive pads 233, 234 with solder arranged in a second pattern that is a mirror of the first pattern on the main printed circuit board 220.

The mounting surface 232 of the SMT touch pad 230 is placed onto the top surface 221 of the main printed circuit board 220 and the SMT touch pad 230 is soldered onto the SMT area 222 of the main printed circuit board 220.

Figure 5:
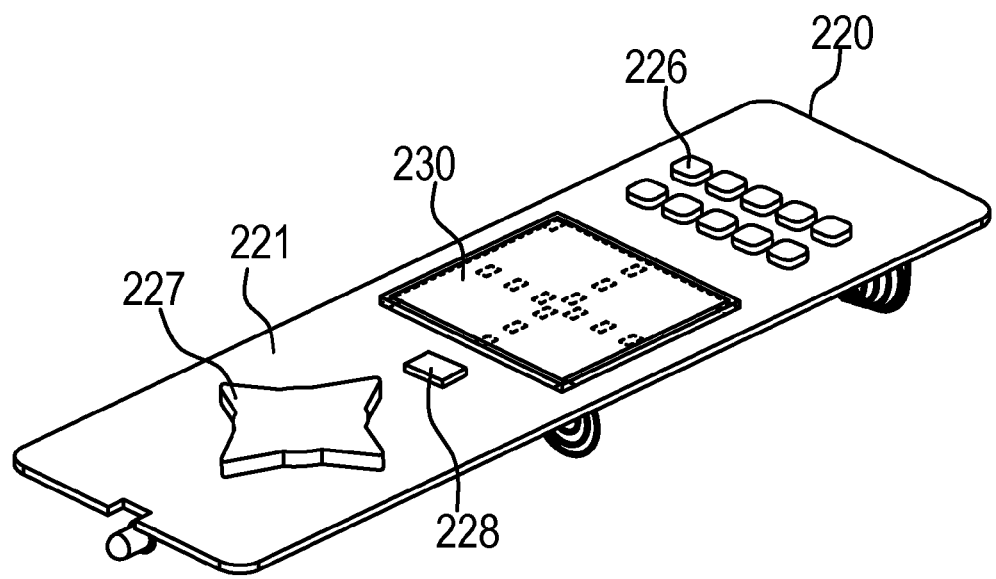
FIG. 5 is a schematic view of an assembly of the main printed circuit board and the SMT touch pad in accordance with an embodiment of the invention.

FIG. 5 is a schematic view of an assembly of the main printed circuit board 220 and the SMT touch pad 230 in accordance with an embodiment of the invention. As shown in FIG. 5, the SMT touch pad 230 is mounted on the top surface 221 of the main printed circuit board 220.

With reference to FIG. 2 again, the back cover 240 is mounted on a bottom surface of the front cover 210, and has an inner space 241 concavely. The battery housing 250 is disposed within the inner space 241

In this embodiment, the portable electronic device 200 with an SMT touch pad is a remote control. Alternatively, the portable electronic device 200 with an SMT touch pad can be a smart phone, a tablet computer, a notebook computer, or the like.

As cited, the present invention uses the surface mount technology to mount the SMT touch pad 230 on the top surface 221 of the main printed circuit board 220 without having to bend the flexible cable 121 to pass through the opening 113 as shown in the prior art. In addition, it can easily assemble the SMT touch pad 230 and the main printed circuit board 220 by soldering directly, so as to reduce the work-piece processing time and reduce the working time and cost dramatically.

Although the present invention has been explained in relation to its preferred embodiment, it is to be understood that many other possible modifications and variations can be made without departing from the spirit and scope of the invention as hereinafter claimed.

What is claimed is:

1. A portable electronic device with a surface mounted technology (SMT) touch pad, comprising:
 a main printed circuit board having a top surface arranged thereon a SMT area, and a bottom surface, wherein the SMT area has a plurality of conductive pads arranged in a first pattern; and
 a SMT touch pad having a touch surface and a mounting surface formed thereon a plurality of conductive pads with solder arranged in a second pattern that is a mirror of the first pattern on the main printed circuit board;
 wherein the mounting surface of the SMT touch pad is placed onto the top surface of the main printed circuit board and the SMT touch pad is soldered onto the SMT area of the main printed circuit board;
 wherein the main printed circuit board comprises:
 a plurality of selecting buttons distributed on the top surface of the main printed circuit board; and
 a directional selecting element installed on the top surface of the main printed circuit board, the directional selecting element having four directional edges for being pressed conveniently.

2. The portable electronic device as claimed in claim 1, wherein the main printed circuit board further comprises:
 a control circuit connected to the SMT touch pad through soldering the SMT touch pad onto the SMT area of the main printed circuit board, so as to control operation of the SMT touch pad.

3. The portable electronic device as claimed in claim 2, further comprising:
 a front cover including a plurality of key openings corresponding to the plurality of selecting buttons, and a directional opening corresponding to the directional selecting element; and
 a back cover mounted on a bottom surface of the front cover.

4. The portable electronic device as claimed in claim 3, wherein the first pattern and the second pattern each is a cross-like pattern.

5. The portable electronic device as claimed in claim 4, wherein each of the plurality of selecting buttons is a thin film switch.

6. The portable electronic device as claimed in claim 5, wherein the portable electronic device is a remote control.

7. The portable electronic device as claimed in claim 1, wherein the portable electronic device is a smart phone.

8. The portable electronic device as claimed in claim 1, wherein the portable electronic device is a tablet computer.

9. The portable electronic device as claimed in claim 1, wherein the portable electronic device is a notebook computer.

* * * * *